No. 733,198. Patented July 7, 1903.

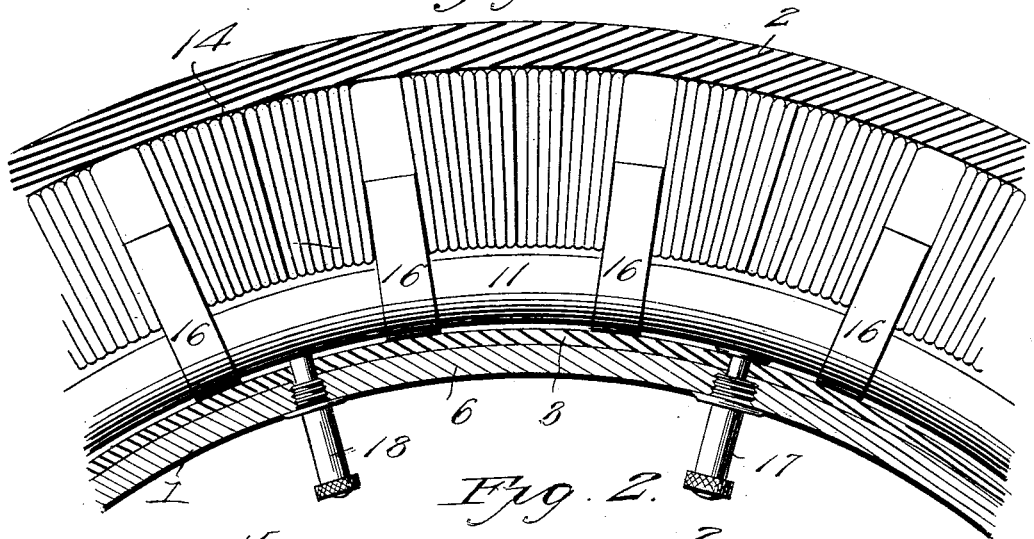
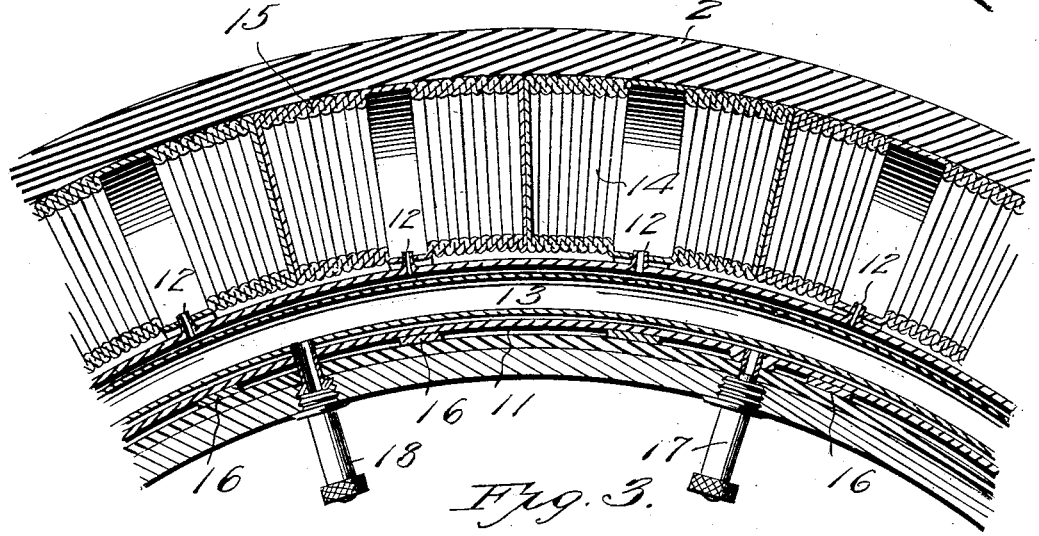
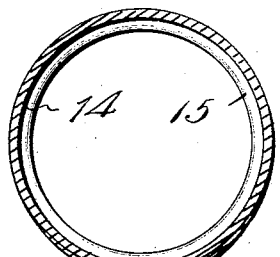

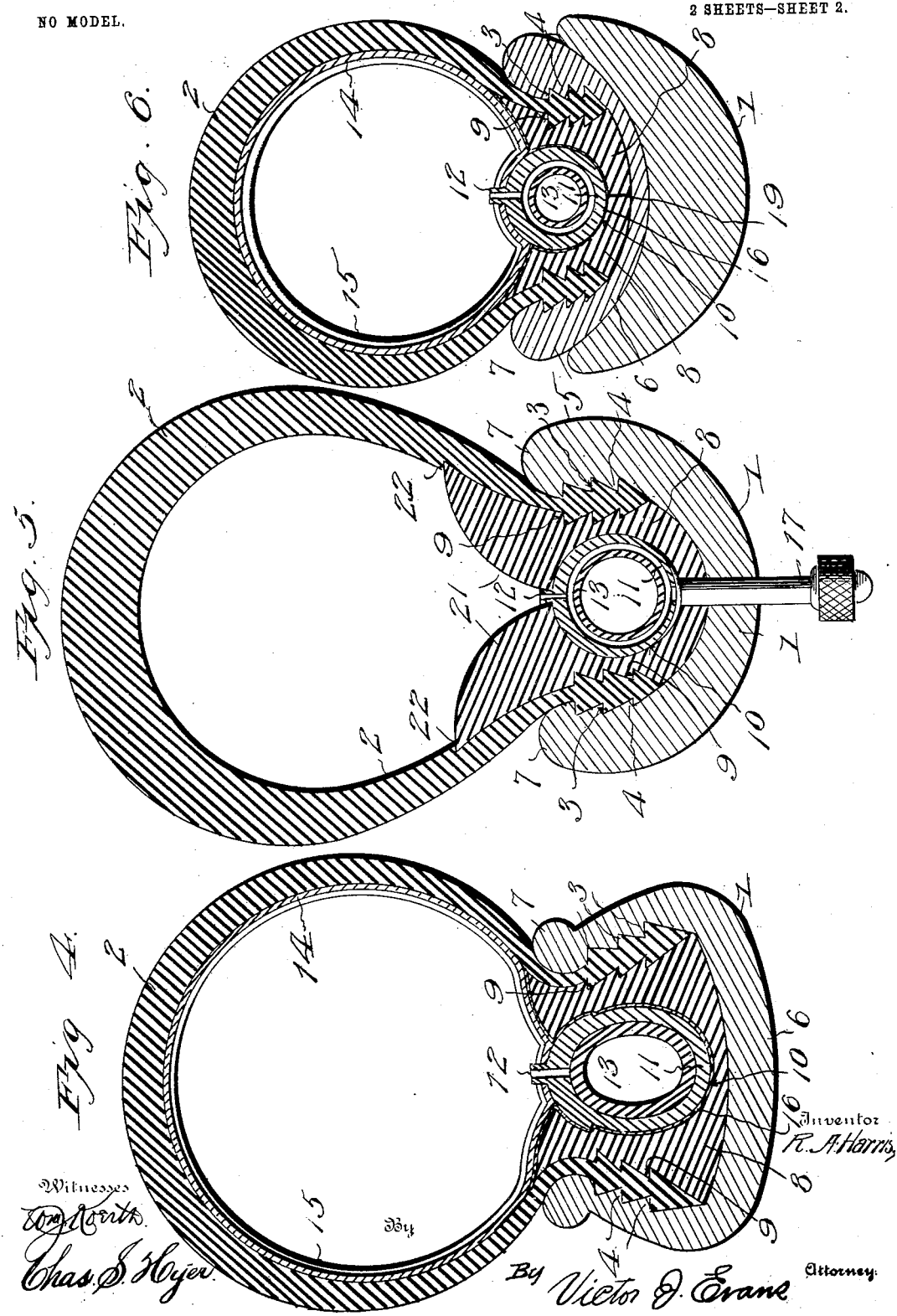

UNITED STATES PATENT OFFICE.

ROBERT A. HARRIS, OF TUCSON, ARIZONA TERRITORY.

PNEUMATIC TIRE.

SPECIFICATION forming part of Letters Patent No. 733,198, dated July 7, 1903.

Application filed December 17, 1902. Serial No. 135,560. (No model.)

*To all whom it may concern:*

Be it known that I, ROBERT A. HARRIS, a citizen of the United States, residing at Tucson, in the county of Pima and Territory of Arizona, have invented new and useful Improvements in Pneumatic Tires, of which the following is a specification.

This invention relates to pneumatic tires for use on bicycles, automobiles, and vehicles of all kinds, the object in view being to reduce to a minimum the evils and inconveniences due to punctures, while still retaining the resiliency and other advantages of the ordinary pneumatic tire.

In designing the tire hereinafter particularly described I have constructed the same with special reference to accessibility, so that the tire may be readily repaired at slight cost and inconvenience. While the original cost of manufacture will be somewhat greater than an ordinary pneumatic tire, the cost of keeping the tire in good repair will more than offset the increase in the first cost, and at the same time a tire is obtained which is safe and reliable in use. The tire may be punctured in two, three, or more places without interfering with the use of the same and without necessitating even the stopping of the vehicle, provision being made whereby the release of air due to one or more punctures is automatically compensated for.

A further object of the present invention is to provide novel means for inflating a tire and keeping the same inflated, reducing to a minimum the chance of leakage and deflation of the tire.

A further object of the invention is to provide effective and reliable means for securing the tire in place and fastening the same firmly upon the wheel-rim.

With the above and many other objects in view, the nature of which will more fully appear as the description proceeds, the invention consists in the novel construction, combination, and arrangement of parts, as hereinafter fully described, illustrated, and claimed.

In the accompanying drawings, Figure 1 is a central longitudinal section through a tire constructed in accordance with the present invention, showing the inflating-tube and the inflatable sections in elevation. Fig. 2 is a similar section taken also through the inflatable sections and the cut-off tube. Fig. 3 is a cross-section through one of the inflatable sections, showing the securing-straps therefor. Fig. 4 is an enlarged cross-sectional view of a tire constructed in accordance with the present invention, showing all parts thereof assembled as they appear in actual use. Fig. 5 is a similar view showing what may be termed a "single-tube tire" or one not employing independent inflatable sections. Fig. 6 is a view similar to Fig. 4, showing some slight modifications principally in the form and arrangement of parts.

Like reference-numerals designate corresponding parts in all the figures of the drawings.

The pneumatic tire contemplated in this invention is adapted to be applied to any vehicle-wheel rim, the numeral 1 designating such rim. The tire comprises, essentially, an outer case or cover 2, which is preferably thickest at the tread portion, so as to impart thereto the requisite wearing qualities. The outer case or covering is of a width commensurate with the size of the tire when completed and inflated, and the longitudinal edge portions of said outer casing are provided both interiorly and exteriorly with a plurality of shoulders 3, giving to each edge of the tire in cross-section the appearance of a series of arrow-heads or spear-points, as clearly shown in Figs. 4, 5, and 6. The shoulders 3 upon the outer surfaces of the case 2 are adapted to engage and interlock with the corresponding series of ribs or shoulders 4 on the inner surface of the flanges 5 of a false rim 6, which may be secured to the wheel-rim 1 in any convenient manner. By preference the edges of the flange 5 are rounded, as shown at 7, to prevent chafing and wearing on the outer case 2.

Extending around the false rim 6 and between the flanges 5 is what I term a "seat" 8, which is preferably composed of some soft flexible material, such as rubber. The sides of the seat 8 are corrugated or provided with shoulders 9, corresponding with and adapted to receive the pressure of the shoulders 3 on the inner surface of the outer case 2, so as to interlock therewith. Centrally the seat 8 is provided with a groove or recess 10, which receives an inflating-tube 11, extending entirely around the wheel-rim and forming part of the complete tire. The tube 11 is provided at regular intervals with outwardly-projecting nipples 12, forming air-ports through which the air forced into the inflating-tube 11 passes into the main body of the tire, as hereinafter more fully explained. Within the inflating-tube 11 is arranged another tube 13, which I term the "cut-off" tube, as it serves when expanded by inflation to close the ports leading through the nipples 12, thereby preventing the compressed air within the tire from escaping and maintaining the tire in an inflated condition.

Under the preferred embodiment of this invention the outer case is filled from end to end with a series of inflatable sections 14, the number of which may be increased or diminished, according to the will of the manufacturer. Each of said sections 14 is made by preference in a form somewhat resembling a bellows, the walls 15 thereof being crimped to admit of the necessary expansion and contraction of the section under the influence of the air passing thereto or therefrom, each section being adapted to expand lengthwise to an extent approximately equal to twice its length under normal conditions. By reason of this feature of construction should an inflatable section 14 become punctured and deflated the adjoining sections on opposite sides thereof will automatically expand and take up the greater part of the space previously occupied by the section which has been punctured, thus automatically compensating for the loss of the punctured section.

Secured to about the center of each inflatable section 14 is a strap or straps 16, adapted to be passed around the inflating-tube 11, so as to securely fasten each inflatable section 14 to the inflating-tube. This keeps all of the inflatable sections in proper relative positions, facilitating both the construction and repair of the tire as a whole.

17 and 18 represent inflating-valves, the stem of the valve 17 communicating with the inflating-tube 11 and the stem of the valve 18 communicating with the inner cut-off tube 13. By this arrangement the tubes 11 and 13 may be separately and independently supplied with air from a suitable air compressor or pump.

In operation after the parts of the tire are properly associated with the rim air is forced through the valve 17 into the inflating-tube 11, whence it passes through the nipples 12 into each and all of the inflatable sections 14. When the tire has thus been sufficiently inflated for riding purposes, the valve 17 is closed and air is then forced through the valve 18 into the inner cut-off tube 13 until a pressure is obtained in excess of that in the inflatable sections. In inflating the cut-off tube 13 all air is forced out of the inflating-tube 11 into the sections 14, and when the pressure in the cut-off tube exceeds that in the sections 14 the tube 13 closes and seals all of the ports leading through the nipples 12 into the inflatable sections, thus preventing the air from escaping from the sections 14 and causing a collapse of the tire. The valves 17 and 18 are of course provided with suitable closing-caps to prevent the escape of air therefrom.

Fig. 6 illustrates some slight modifications in the form of certain parts. For example, the recess in the seat 8 to receive the inflating and cut-off tubes is round or cylindrical, whereas in the preferred embodiment of the tire, as illustrated in Fig. 4, said recess or groove is elliptical, the object of the elliptical form being to give greater side pressure for effecting a more reliable and positive interlocking engagement between the shoulders on the outer case 2, seat 8, and the flanges 5 of the rim 6. In Fig. 6 the seat 8 is also shown as being divided centrally at 19 into two equal sections, which arrangement somewhat facilitates the assembling of the parts of the tire; otherwise the principles involved in the construction shown in Fig. 6 are the same as those involved in the construction shown in Fig. 4.

In Fig. 5 I have illustrated the principles of this invention as applied to what may be termed a "single-tube tire," 2 designating the main body or tube of the tire, 5 the false rim, and 8 the tire-seat. The seat 8 is provided with a groove or recess 10 to receive the inflating or cut-off tubes 11 and 13, respectively, but in order to secure and properly position and shape the outer case 2 the side portions of the seat 8 are expanded to form laterally-projecting wings or cheek portions 21, which bear against the inner surface of the outer case 2 above and beyond the outer surface of the rim 6. The inner surface of the case 2 may also be provided with grooves 22 to receive the edges of the wings 21, thus insuring the proper spacing apart of the side walls of the inner portion of the tire or case 2 when inflated. The seat 8 forms in reality what is known in the art as a "locking-strip," its function being to lock the edges of the outer case or cover of the tire and the rim, so as to prevent accidental separation between the rim and tire. By allowing the air to escape through the valves 17 and 18 the tubes 11 and 13 collapse, which also allows the seat or locking-strip to collapse, whereupon one or both of the edges of the outer case or covering of the tire may be disconnected from the rim, thus giving ready access to all the parts of the tire for repair or renewal.

From the foregoing description it will be understood that ample provision has been made for giving access to all parts of the tire for renewal or repair without sacrificing speed or durability. Punctures may be repaired from the inside of the tire, which has been proved to be better and more durable than where punctures are repaired from the exterior of the tire. The main air-chamber sets almost entirely beyond or outside of the wheel-rim, allowing the entire resilient properties of the tire to be utilized. The seat or locking-strip of the tire also adds to the resiliency of the tire as a whole, absorbing much of the vibration and shock, and to that extent relieving the rim and wheel. These features add materially to the speed of the tire when in use. In case of puncture it is not necessary to stop and make repairs, as it will be understood that one, two, or more of the inflatable sections may become punctured or deflated without seriously affecting the tire. This is due to the fact that adjacent sections automatically expand, taking the place of the deflated sections and compensating therefor. With the construction described it is also practical to make use of a much lighter outer casing or covering than otherwise. This enables a tire of maximum resiliency to be produced. By giving an elliptical shape to the inflating-tube a better side pressure is obtained, which is effective in more securely fastening the tire against the rim and the seat or locking-strip against the tire.

Instead of inflating the cut-off tube 13 with air, water or other liquid may be pumped into said tube until a sufficient pressure is obtained to close and seal all of the parts leading into the various inflatable sections 14. This will be found especially useful where the tire is subjected to severe tests and usage, as in the case of a long-distance race without stops, the water acting to absorb the heat from the air contained in the tire, and thus preventing any undue expansion of the tire caused by the presence of the superheated air therein.

It will of course be understood that the tire hereinabove described, and illustrated in the accompanying drawings, is susceptible of many changes in the form, proportion, and minor details of construction, and I therefore reserve the right to change, modify, or vary the construction within the scope of the appended claims.

Having thus described the invention, what is claimed as new is—

1. A pneumatic tire comprising an outer case, and a series of independent inflatable sections arranged therein, each of said sections being of bellows form providing for expansion lengthwise of the tire.

2. A pneumatic tire comprising a rim, the flanges of which are internally shouldered, an outer case or cover having its longitudinal edge portions internally and externally shouldered, a seat or locking-strip exteriorly shouldered to interlock with the shoulders on the outer case or cover, and to force the shoulders of the outer case into interlocked engagement with the shoulders on the rim-flanges, and a tube arranged in a groove or recess extending lengthwise of the locking-strip, said tube being adapted to be inflated, substantially as and for the purpose described.

3. The combination with a wheel-rim, of a false rim secured thereto and provided with flanges having internal shoulders extending lengthwise thereof, a seat or locking-strip extending around the false rim and provided at opposite sides with corresponding locking ribs or shoulders extending lengthwise thereof, an outer case or cover having its longitudinal edge portions provided exteriorly and interiorly with shoulders extending lengthwise thereof, and a tube seated within the locking-strip or seat and adapted when inflated to expand the locking-strip and maintain an interlocked engagement between the shoulders on the locking-strip, outer case and rim, substantially as described.

4. A pneumatic tire comprising a series of independent sections, each of which is of bellows form providing for expansion and contraction lengthwise of the tire, an inflating-tube extending lengthwise of the tire and communicating with said sections, and an inflatable cut-off tube inclosed by the inflating-tube and adapted to seal the ports leading from the inflating-tube into the body of the tire.

5. A pneumatic tire comprising a rim, an outer casing or cover, a series of independent inflatable sections arranged therein, each of said sections being of bellows form providing for the expansion lengthwise of the tire, a seat or locking-strip adapted to engage the outer case or cover and locking the same to the rim, an inflating-tube extending lengthwise of the tire and provided with one or more ports leading into the main body of the tire, a cut-off tube extending lengthwise within the inflating-tube, and independent valves communicating with the inflating-tube and the cut-off.

In testimony whereof I affix my signature in presence of two witnesses.

ROBERT A. HARRIS.

Witnesses:
V. S. GRIFFITH,
J. KNOX CORBETT.